Dec. 12, 1967      C. A. SAMFORD      3,357,717
VEHICLE SEATING ARRANGEMENTS
Filed Dec. 21, 1965      4 Sheets-Sheet 1
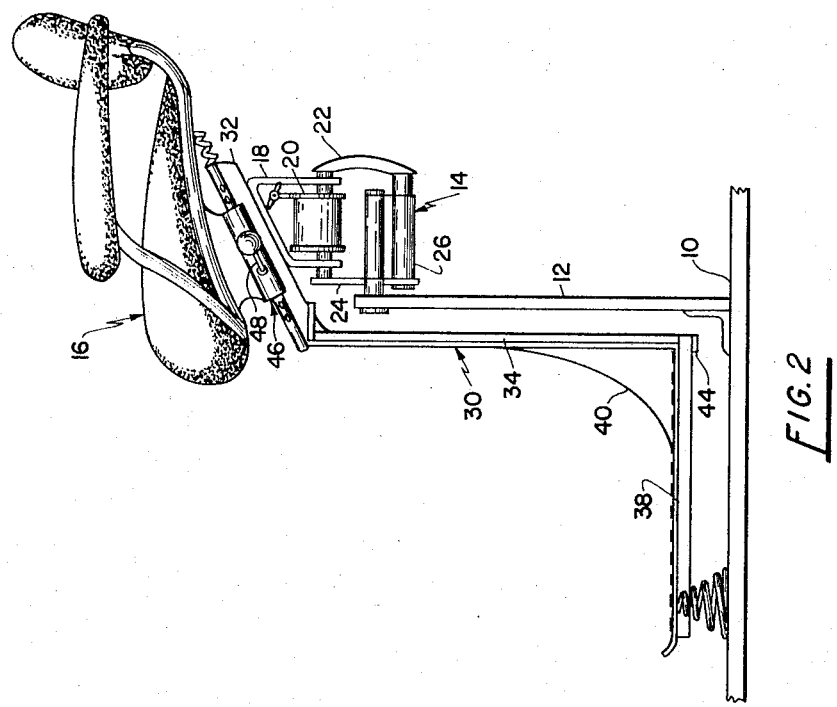
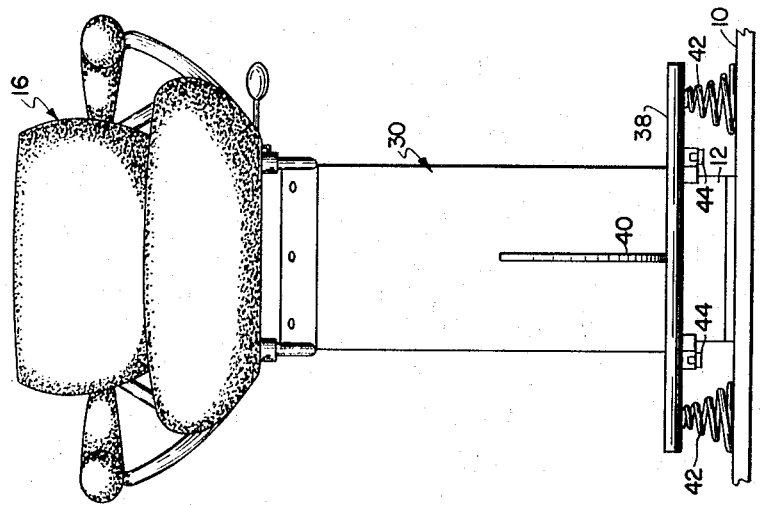
INVENTOR
C. ARCHIE SAMFORD
BY Strauch, Nolan, Neale,
Nies & Bronaugh
ATTORNEYS Dec. 12, 1967  C. A. SAMFORD  3,357,717
VEHICLE SEATING ARRANGEMENTS
Filed Dec. 21, 1965  4 Sheets-Sheet 2
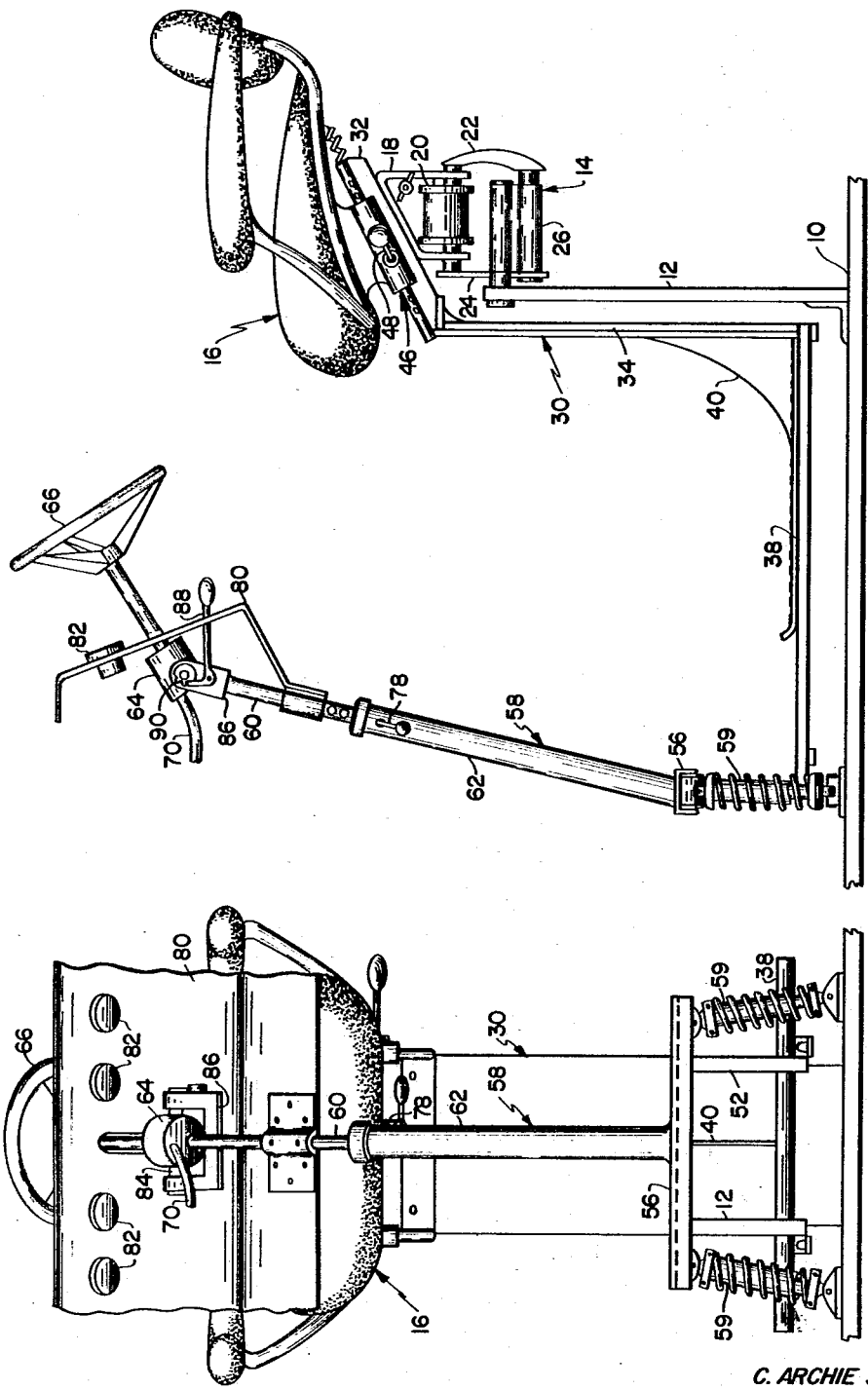
INVENTOR
C. ARCHIE SAMFORD
BY Strauch, Nolan, Neale, Nies & Bronaugh
ATTORNEYS

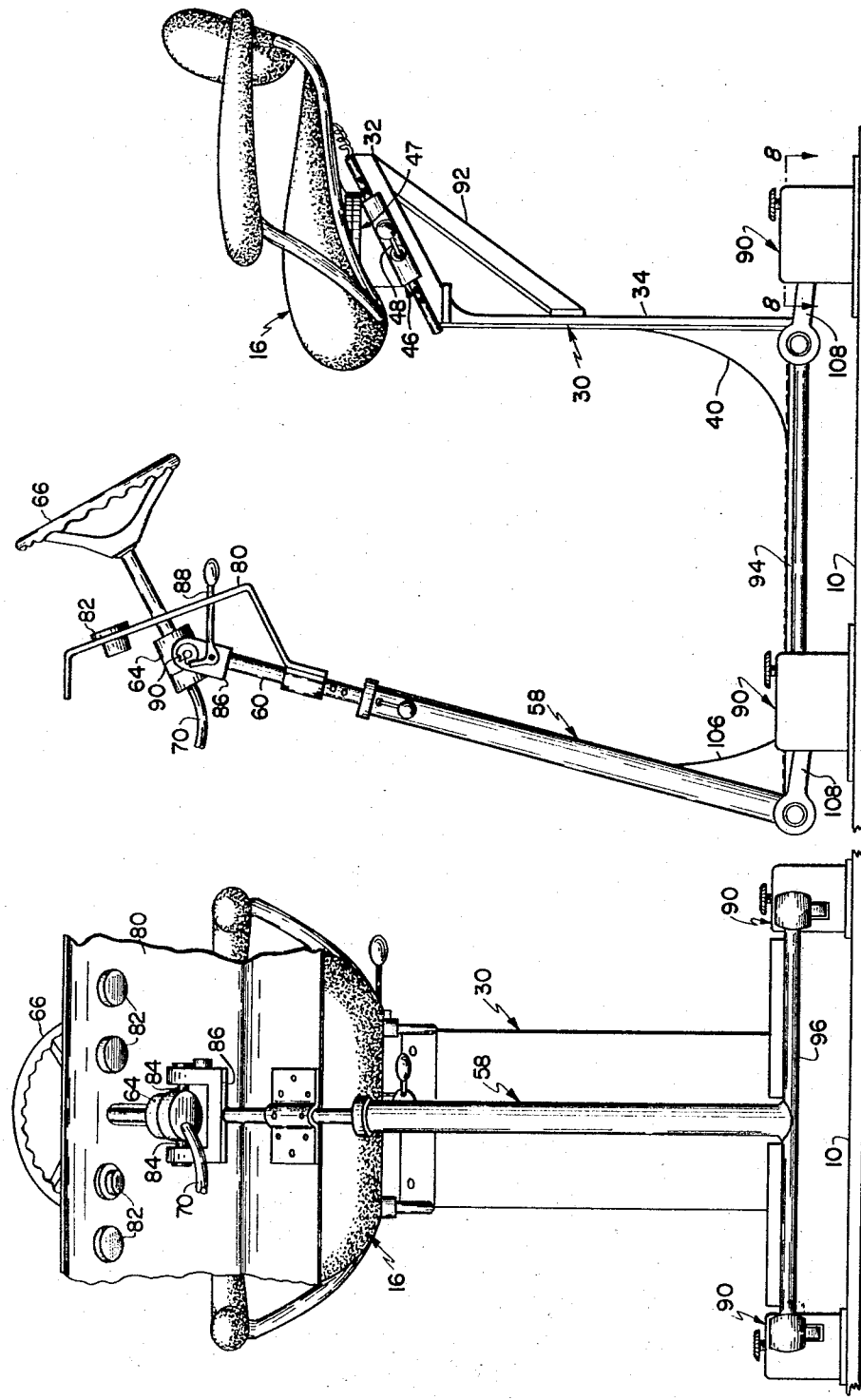

Dec. 12, 1967  C. A. SAMFORD  3,357,717
VEHICLE SEATING ARRANGEMENTS
Filed Dec. 21, 1965  4 Sheets-Sheet 4
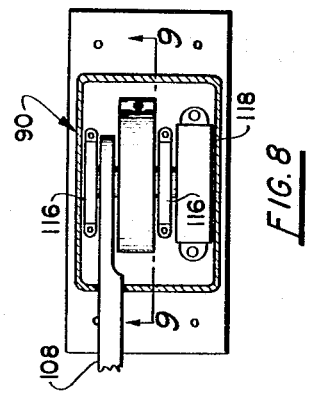
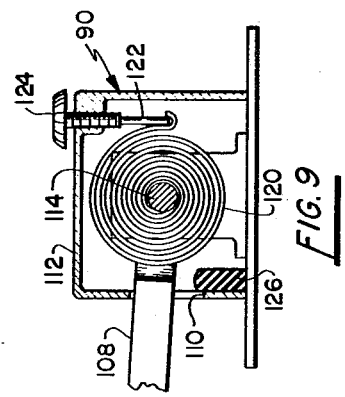
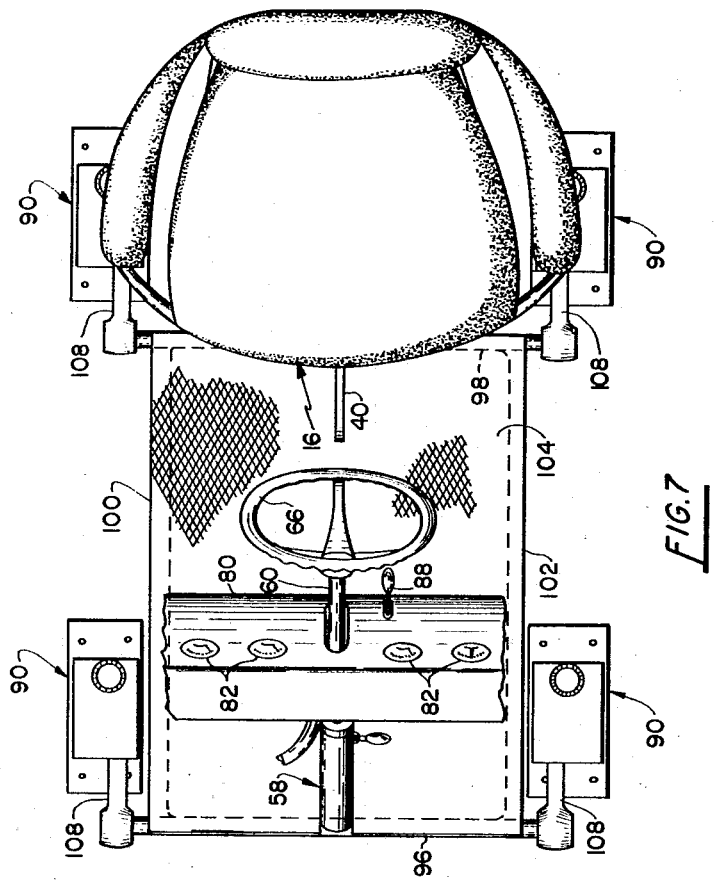
INVENTOR
C. ARCHIE SAMFORD
BY Strauch, Nolan, Neale,
Nies & Bronaugh
ATTORNEYS

United States Patent Office 3,357,717
Patented Dec. 12, 1967

3,357,717
VEHICLE SEATING ARRANGEMENTS
Cloyd Archie Samford, R.R. 1, Chrisman, Ill. 61924
Filed Dec. 21, 1965, Ser. No. 515,425
4 Claims. (Cl. 280—87)

ABSTRACT OF THE DISCLOSURE

An operator's station for vehicles in which the support for the operator's torso and feet are combined with a support for the vehicle controls, the entire operator's station being spring suspended from the vehicle body.

---

This application is a continuation-in-part of co-pending application, Ser. No. 441,966 filed Mar. 23, 1965, for Vehicle Seating Arrangements and since abandoned.

This invention is of broad utility and may be utilized in many types of vehicles including all types of land vehicles as well as boats and aircraft. For present purposes it will be described as applied to heavy duty off-the-highway equipment since this is an environment in which the advantages of the invention are more fully realized.

In recent years the matter of operator comfort has become of increasing interest to manufacturers of equipment of this type particularly farm equipment such as tractors, self-propelled combines and the like. Continuing efforts have been made to provide increased seating comfort and seats on tractors and similar equipment are heavily cushioned and fully adjustable and are often equipped with expensive springs or shock absorbers which are adjustable to accommodate operators of widely varying weights. As a consequence the seats used on heavy duty vehicles such as tractors may be more costly than those used in the most expensive passenger cars. Nonetheless, known seating arrangements, despite their cost and complexity, do not provide true driver comfort and relief from fatigue since their designs do not recognize nor eliminate the principal source of discomfort and fatigue which is caused by the excessive body movement experienced by the operator when seated or by the complete absence of effective cushioning or springing when the vehicle is operated with the driver in a standing position. More specifically, when the driver is seated he is subjected to constant movement of the hip, knee and ankle joints and the arm, back and shoulder muscles, which after a relatively short time produce fatigue and discomfort. When the operator is standing his entire body is subject to essentially the full shock load imposed on the vehicle.

With the foregoing considerations in mind it is a principal purpose and object of the present invention to eliminate driver discomfort and fatigue caused by the relative movement of the torso and legs of the operator and to provide a unique seating arrangement affording fully cushioned support for the entire body of the operator whether he is seated or standing.

It is a more specific object of the persent invention to provide improved vehicle seating arrangements including a seat and a footrest connected for co-movement and spring suspended as a unit from the vehicle.

It is a further object to provide in a vehicle having a steering device, wheel, lever or other system, a unique mechanism for connecting the driver's seat, footrest, and the steering device for vertical co-movement.

Additional objects and advantages of the present invention will become apparent as the description proceeds in connection with the accompanying drawings in which:

FIGURE 1 is a front view of one form of vehicle seat constructed in accordance with the present invention;

FIGURE 2 is a side elevation of the seat of FIGURE 1;

FIGURE 3 is a front elevation of a second embodiment of the invention in which the steering apparatus as well as the vehicle seat and footrest are suspended as a unit from the vehicle;

FIGURE 4 is a side elevation of the embodiment of FIGURE 3;

FIGURE 5 is a front view of a third embodiment of the invention illustrating another form of spring suspension;

FIGURE 6 is a side elevation of the embodiment of FIGURE 5;

FIGURE 7 is a top plan view of the embodiment of FIGURES 5 and 6;

FIGURE 8 is an enlarged fragmentary section of a portion of the spring suspension taken along line 8—8 of FIGURE 6; and FIGURE 9 is a vertical section taken along line 9—9 of FIGURE 8 showing further details of the suspension.

Referring now more particularly to the drawings especially to the embodiment of FIGURES 1 and 2, the construction therein shown may be used with particular advantage in a farm equipment vehicle, particularly a tractor. Details of the vehicle apart from the seat support structure have been omitted for clarity since these details form no part of the present invention.

In a typical case the vehicle will have a heavy horizontal floor or platform 10. A vertical support member 12, rigid with the floor or platform 10, carries at its upper end a torsion bar suspension system indicated generally at 14 which supports the seat proper 16. The cushioning suspension system 14 is of wholly conventional construction and is of the type employed on several tractors now on the market. In general, it comprises a bracket 18 suitably attached to the seat 16 and carrying an upper torsion spring assembly 20 connected by inclined links 22 and 24 to a lower torsion spring assembly 26 mounted on the vertical support. The entire cushioning suspension assembly 14 is thus effective to support the seat 16 for cushioned vertical movement while holding it securely against lateral fore and aft movement. Other types of cushioning systems, including conventional coil springs, having the same function may be substituted for the assembly 14.

In accordance with the conventional prior practice the operator of the vehicle either when seated or when standing placed his feet on the platform 10 which formed a solid part of a vehicle chassis and thus had the benefit only of the rudimentary and relatively stiff spring suspension conventionally employed in heavy duty vehicles. Accordingly, when the operator was standing his body was subjected to the full shock load imposed on the vehicle chassis with resulting discomfort and fatigue. Similarly, when the operator was seated the constant relative movement between the seat 16 and the platform 10 caused constant flexing of the hip, knee and ankle joints of the operator and subjected the feet and legs of the operator to a relatively severe pounding which caused discomfort and fatigue. It is important to note that these conditions are not alleviated by cushioning the seat 16 or by softening the spring suspension 14. In fact, the latter approach increases the objectionable body movements.

In accordance with the present invention these problems are solved by the provision of the assembly indicated generally at 30 which provides for a cushioned suspension system of the feet and legs of the operator at all times and provides for correlated movement of the entire body of the operator.

The assembly 30 comprises a bracket having an upwardly and rearwardly inclined portion 32 providing a support for the seat assembly 16, and a vertical portion 34 extending downwardly generally in alignment with the front of the seat 16 when the seat is in its rearward position. The lower end of the bracket 34, which terminates at a point well above the level of platform 10, carries a horizontal footrest 38 which extends generally parallel to the platform 10. The footrest is preferably formed of heavy expanded metal to reduce the accumulation of dirt and provide for ventilation. A central gusset 40 is provided to increase the rigidity of the assembly. At its forward projecting end the footrest 38 is supported by a pair of coil springs 42 to enhance the stability and balance of the assembly. Rubber snubbers 44 are positioned at the corners of the footrest 38 to protect the assembly in event of overload.

The seat assembly is supported on the bracket portion 32 by a conventional adjustable mount assembly 46 which permits the movement of the seat upwardly and rearwardly or downwardly and forwardly to accommodate operators of different size. If desired the assembly 46 may include a swivel connection 47 as shown in FIGURE 6. The seat is held in adjusted position by a latch mechanism 48.

The horizontal platform 38 is of sufficient width to provide excellent support even when the driver is standing on it when operating the vehicle. By virtue of the present invention he has the same cushioned support when standing as when seated. When the operator is seated his entire body is supported by the cushioning system and the objectionable relative movements of the parts of the body are completely eliminated, thus eliminating a source of fatigue and discomfort inherently associated with all known prior vehicle seating constructions.

The embodiment of the invention disclosed in FIGURES 3 and 4, includes a feature providing further driver comfort and can be utilized in any vehicle equipped with hydraulic, electric or other total power steering. This form of the invention includes provision for moving the steering wheel or other steering device vertically with the seat and footrest thus eliminating the arm movements otherwise caused by constant relative vertical movement between the seat and the steering wheel or other steering device.

The embodiment of FIGURES 3 and 4, is identical to the embodiment of FIGURES 1 and 2, except for the steering wheel or other steering device support which will now be described. Conveniently, this support includes a pair of vertical arms 52 suitably secured to the front edge of the elongated footrest 38. At their upper ends the arms 52 are connected by a cross-bar 56 to which the lower end of the steering support column 58 is rigidly attached. Combined adjustable spring and shock absorber assemblies 59, secured at their opposite ends to the platform 10 and the ends of the cross-bar 56, are provided to support, cushion and stabilize the forward end of the assembly. Preferably, the column assembly 58 is composed of telescoping tubular members 60 and 62, the former being attached to the cross-bar 56 and the latter supporting a control box 64 to which the steering wheel 66 is connected. The telescoping column members 60 and 62 may be held in adjusted position by a pin 78 or other suitable mechanism. The vertical movement of the steering wheel as well as its vertical adjustment are accommodated by flexible lines 70 which may be hydraulic or electric and which connect the power steering control unit to the main steering apparatus in accordance with conventional practice.

For added convenience, the instrument panel 80 is carried by the upper adjustable portion of the steering column 60. This arrangement makes the instruments 82 instantly and easily readable even when the vehicle is traveling over rough terrain.

To further increase operator comfort the steering wheel 66 is preferably mounted for tilting movement. To this end the control box 64 is provided with oppositely projecting stub shafts 84 journalled in upwardly projecting arms of a U-shaped bracket 86 carried by the upper end of the steering column 60. Steering wheel 66 may be released and locked in any adjusted position by a control member 88 engageable with a ratchet 90 carried by the outer end of one of the shafts 84.

The embodiment of FIGURES 5 through 9, which will now be described in detail, is essentially the same as that of FIGURES 3 and 4 described above except for the suspension system. In this form of the invention the rear torsion suspension system 14 and the front spring shock absorbers 59 are replaced by four identical suspension assemblies indicated generally at 90. In view of the elimination of the rear suspension assembly 14 one or more reinforcing brackets 92 are provided between the vertical and the inclined portions of the bracket assembly 30.

To accommodate the suspension assemblies 90 a modified footrest assembly 94 is provided which comprises a tubular frame comprising front and rear tubular members 96 and 98, respectively, connected to longitudinally extending side tubes 100 and 102. The tubes form a rigid rectangular frame covered by a suitable rigid panel or sheet 104. The steering column assembly is welded or otherwise rigidly secured at its lower end to the front cross tube 96, the connection being reinforced by a gusset 106.

As best shown in FIGURE 7 the ends of the front and rear tubes 96 and 98 project beyond the side tubes 100 and 102 and are rotatably received in the free ends of support arms 108 projecting forwardly from each of the suspension assemblies 90. The opposite ends of the arms, 108 which project through vertically elongated openings 110 in the suspension housings 112, are rigidly connected to transverse shafts 114 rotatably mounted in bearings 116. One end of each of the shafts 114 extends into a rotary shock absorber assembly 118 of conventional construction which dampens the rotary movements of the shafts 114.

The central portion of the shaft 114 is rigidly connected to the inner end of a spiral spring 120 the outer end of which is engaged by an adjustment rod 122 threaded into the housing 112 and provided with an adjusting knob 124 at its outer end. The action of the springs 120 is to bias the arms 108 in a clockwise direction as viewed in FIGURES 6 and 9 with a force which may be adjusted by the knob 124. The suspension assemblies 90 are completed by snubbers 126 which yieldably limit downward movement of the support arms 108.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by Letters Patent is:

1. An operator station for a vehicle having a body, said vehicle also having steering device comprising a seat assembly for supporting the torso of the operator, a platform assembly, said spring suspensions being constructed said body extending at least from the rear of said seat assembly to the front of said platform assembly, means connecting said seat assembly on said platform assembly to dispose said platform assembly below and forwardly of said seat assembly to form a unitary operator support assembly, means mounting said steering device on the forward portion of said support assembly to dispose said steering device forwardly of said seat assembly, and means spring suspending said support assembly on said body comprising a first spring suspension interposed between said support assembly and said body adjacent the rear of said support assembly and a second spring suspension comprising laterally spaced essentially vertically acting spring assemblies secured to said platform assembly and to said body closely adjacent the forward portion of said platform assembly, said spring suspension being constructed and arranged to maintain said platform essentially horizontal under varying load conditions and thereby cooperating to provide stable cushioned support for said operator in both standing and sitting positions.

2. The operator station according to claim 1 together with means for adjusting the relative position of said seat assembly and said platform assembly.

3. The operator station according to claim 1 wherein said platform assembly is of elongated rectangular configuration and said first spring suspension comprises a pair of independent spring assemblies interposed respectively between said body and a rear corner of said platform assembly.

4. The operator station according to claim 1 wherein the means for mounting said steering device on said platform assembly comprises an extensionable column connected at its lower end to said platform assembly and projecting upwardly therefrom, said extensible column permitting vertical adjustment of the position of said steering device.

References Cited

UNITED STATES PATENTS

| | | | |
|---|---|---|---|
| 283,803 | 8/1883 | Moehl et al. | 297—429 X |
| 887,701 | 5/1908 | Schoening | 280—87 |
| 2,503,942 | 4/1950 | Engelberg et al. | 297—69 |
| 2,833,367 | 5/1958 | Pool et al. | 180—77 |
| 3,039,553 | 6/1962 | Van Der Lely et al. | 180—77 |

FOREIGN PATENTS

| | | |
|---|---|---|
| 162,106 | 4/1921 | Great Britain. |

A. HARRY LEVY, *Primary Examiner.*

UNITED STATES PATENT OFFICE
CERTIFICATE OF CORRECTION

Patent No. 3,357,717                      December 12, 1967

Cloyd Archie Samford

It is hereby certified that error appears in the above numbered patent requiring correction and that the said Letters Patent should read as corrected below.

Column 1, line 59, for "persent" read -- present --; column 4, line 58, strike out ", said spring suspensions being constructed" and insert instead -- for supporting the feet of the operator, --; column 5, line 16, for "extensionable" read -- extensible --.

Signed and sealed this 21st day of January 1969.

(SEAL)
Attest:

Edward M. Fletcher, Jr.                      EDWARD J. BRENNER

Attesting Officer                              Commissioner of Patents